(12) United States Patent
Schlenker

(10) Patent No.: US 7,100,344 B2
(45) Date of Patent: Sep. 5, 2006

(54) SHUTTERING ELEMENT AND PROCESS FOR MANUFACTURING AND REPAIR OF THE SAME

(75) Inventor: Jurgen Schlenker, Ratingen (DE)

(73) Assignee: Hunneback GmbH, Ratingen (DE)

( * ) Notice: Subject to any disclaimer, the term of this patent is extended or adjusted under 35 U.S.C. 154(b) by 126 days.

(21) Appl. No.: 10/102,758

(22) Filed: Mar. 21, 2002

(65) Prior Publication Data
US 2002/0187293 A1    Dec. 12, 2002

(30) Foreign Application Priority Data
Mar. 22, 2001    (DE) ............................... 101 14 161

(51) Int. Cl.
E04C 2/34    (2006.01)

(52) U.S. Cl. .................... 52/796.1; 52/1; 52/441; 52/783.1; 249/16; 249/18; 249/112; 249/189

(58) Field of Classification Search ................ 52/168, 52/309.1, 309.3, 630, 782.1, 309.2, 396.01, 52/396.04, 415, 440, 441, 783.1, 796.1; 249/13, 249/16, 18, 112, 189
See application file for complete search history.

(56) References Cited

U.S. PATENT DOCUMENTS

| | | | |
|---|---|---|---|
| 3,759,481 A * | 9/1973 | Scott | 249/189 |
| 3,897,928 A * | 8/1975 | Eisler | 249/78 |
| 4,045,262 A * | 8/1977 | Enzinger et al. | 156/62.2 |
| 4,434,119 A * | 2/1984 | Teare | 264/145 |
| 4,767,095 A * | 8/1988 | Fitzgerald et al. | 249/48 |
| 4,856,754 A * | 8/1989 | Yokota et al. | 249/113 |
| 4,917,346 A * | 4/1990 | Mathis | 249/20 |
| 5,098,059 A * | 3/1992 | Sawyer | 249/16 |
| 5,124,187 A * | 6/1992 | Aeschbacher et al. | 428/40.4 |
| 5,454,545 A * | 10/1995 | Taraldsson | 249/115 |
| 5,635,008 A * | 6/1997 | Bianchi et al. | 156/247 |
| 5,725,947 A * | 3/1998 | Johannsen et al. | 428/354 |
| 5,767,423 A * | 6/1998 | Camp et al. | 73/865.6 |
| 6,613,412 B1 * | 9/2003 | Dressler | 428/41.8 |

* cited by examiner

Primary Examiner—Carl D. Friedman
Assistant Examiner—Yvonne M. Horton
(74) Attorney, Agent, or Firm—Pearne & Gordon LLP

(57) ABSTRACT

The shuttering element or similar, with a panel-shaped carrier (2; 7), according to the invention is characterized in that the carrier (2; 7) is covered at least on one side with a film (3; 6), which is attached to the carrier (2; 7) in a replaceable manner by means of an adhesive (4; 10) capable of being deactivated under the influence of heat. The panel-shaped carrier, especially for use in a shuttering element with a core (7) made from synthetic material, wherein, a reinforcing layer (8) with fibers is provided at one or both sides of the core, is characterized in that the fibers consist entirely or predominantly of fiber threads, which extend over the entire length of the carrier. The process for manufacturing and repair of shuttering elements or similar is characterized in that the film facing (3; 6; 22) which forms the surface is applied to the carrier (2; 7; 11; 211) under the influence of heat.

16 Claims, 8 Drawing Sheets

SHUTTERING ELEMENT AND PROCESS FOR MANUFACTURING AND REPAIR OF THE SAME

DESCRIPTION

The invention relates to a shuttering element, in particular for the fabrication of concrete structures, comprising a panel-shaped shuttering panel, which is arranged on or in a frame. Moreover, the invention relates to a process for manufacturing and in particular for replacing and/or for repairing shuttering elements of this kind.

The manufacture of shuttering elements and/or shuttering panels from wood, for example, from plywood is already familiar from DE PS 2848154. However, shuttering elements of this kind have the disadvantage that they swell as a result of penetrating moisture. When subjected to heavy stresses, the protective impregnated layer is destroyed and the surface breaks down into a fibrous quality. As a result, this provides an additional point of attack for penetrating moisture. Furthermore, nail holes, which are made in the shuttering element during use, damage the veneer layer or protective impregnated layer, so that moisture can penetrate there also. Finally, transportation and handling of the known shuttering elements within the context of standard building operations lead to damage to the shuttering skin with which the exposed surface of the concrete is to be fabricated.

The operating life of plywood shuttering elements of this kind is therefore limited.

Known shuttering elements, such as shuttering boards, can be repaired, for example, by filling minor defects or even by implementing replacement patches in the case of damage over larger areas. However, in this context, the surface of the plywood panel becomes structured, which is undesirable when fabricating and/or manufacturing concrete surfaces.

It is true that, unlike plywood panels, known shuttering panels made from synthetic materials (EP 0250730B1 and DE 3804506A1) do not swell as a result of penetrating moisture even when damaged. However, like plywood panels, these panels must be repaired in an expensive and labour-intensive manner in exposed areas if they have suffered damage during use, especially damage to their surface.

After cleaning the shuttering elements and/or shuttering panels with a high pressure water jet or with rotating brushes, any scratches, nail holes and drill holes on the surface must be repaired. It is already known that thermoplastic synthetic materials can be repaired by means of resurfacing welding with a manual welding device. Following this, the damaged area filled in this manner must be milled flat with a hand-held surface milling device. Any perforations and surface damage must be milled to a clean finish and sealed with synthetic patches.

In the case of shuttering elements made from duroplastic synthetic materials, the same repair measures are required as for plywood panels.

In spite of extremely careful implementation of repair measures, these repeatedly and visibly reappear on the surface of the concrete structures fabricated with the assistance of these shuttering elements.

In many cases, shuttering elements for imminent building projects are leased from the manufacturers and suppliers of shuttering elements of this kind. The majority of shuttering elements used are therefore no longer purchased and repaired in-house when this becomes necessary; instead, they are leased in response to demand in a fully functional condition. The lessee expects the shuttering skin to provide an intact surface without surface structures, indeed especially in the case of shuttering elements which have previously been used by third parties. The lessor must therefore repair any damage to the shuttering elements before they are leased again. This is not only labour-intensive but also causes considerable costs.

The invention is based upon the object of designing the damaged shuttering skin and/or surface of a shuttering element in a simple, cost-effective and reusable manner so that it can fulfil all operational requirements and so that no defects and/or weak points can be found on the surface of the shuttering skin which faces the concrete of the shuttered structure.

According to the invention, the damaged skin and/or film provided as a surface on the shuttering panel of a multiple-layer shuttering element can be replaced and renewed in a simple manner. For example, the shuttering elements of a modular shuttering frame can be prepared for re-use in this manner. To replace the shuttering skin, this is released and removed in a targeted manner from the carrier system and/or the shuttering panel without damaging or rendering the carrier system itself un-usable. After the worn and damaged shuttering film has been removed, a new shuttering film is applied to the re-usable shuttering panel and attached to this. Any damage to the shuttering panel and/or the carrier system will not be visible on the surface of shuttering element because of the new full-surface shuttering film or shuttering skin which has been applied.

According to the invention, a multiple-layer shuttering element can be rendered suitable for re-use with an appropriate input of labour while avoiding time-consuming repairs and improvements to the shuttering skin and without the occurrence of disturbing surface structures of the surface of the shuttering element. Scratched or otherwise damaged surfaces of shuttering elements are therefore replaced with new shuttering skins or shuttering films.

In other words, according to the invention, the completed shuttering element is coated with a new shuttering film on the side facing the concrete. The shuttering element according to the invention therefore consists of at least two main functional elements, namely a carrier system and/or shuttering panel and/or a shuttering film and/or shuttering skin, which can be removed without damage from the carrier system and can accordingly be replaced. The shuttering film forms the actual contact surface with the concrete and is responsible for the surface structure and the surface quality of the concrete The carrier system and/or the shuttering panel itself is therefore designed in such a manner that it provides the required carrying capacity. In this context, multiple-layered systems can also be used, in order to reinforce the shuttering panel and/or the carrier system.

Each of the shuttering elements according to the invention may, for example, provide a three- or five-layer structure depending on the level of mechanical stress; however, a 2-, 4- or multiple-layer structure is also possible. Synthetic materials with and without reinforcement or wood materials such as plywood or chip board can be used as the material for the carrier system and/or the shuttering panel. Metallic materials, in particular steel, aluminium and other materials are also possible. Especially in the case of wall shuttering and supports, an adequate rigidity must be provided for the shuttering elements. If necessary, the carrier system can therefore be reinforced with a metal film or also with fibres.

The shuttering film can be a film or board made of synthetic material, preferably polypropylene (PP), polyethylene (PE) and/or polyvinyl chloride (PVC).

The shuttering element according to the invention is designed as a laminated structure. The individual functional layers are attached to one another with adhesive agents. The strength of adhesion of the adhesive bonds is achieved by adhesion and cohesion. In this context, cohesive forces achieve both the internal coherence of the adhesive agent and also of the joined part and/or laminated partner or substrate. The coherence between the adhesive agent and the joined part is produced by forces of adhesion.

In this context, adhesion can be subdivided into mechanical and specific adhesion.

Mechanical adhesion arises as a result of the anchoring of the adhesive agent in the joined part (this is particularly effective in materials such as foamed and/or fibre-reinforced synthetic material, GMT [glass mat-reinforced thermoplastic], wood, especially plywood). In this sense, specific adhesion is based on inter-molecular secondary valency forces. It is meaningful, in this context, to classify adhesive agents into two major groups depending on the type of hardening mechanism:
a) physically hardening adhesive agents:
  solvent-based adhesives, dispersion adhesives, fusion adhesives and contact adhesives
b) chemically hardening adhesive agents:
  polymerisation adhesives, polyaddition adhesives, polycondensation adhesives a) Physically Hardening Adhesive Agents:

In the case of solvent-based adhesives and dispersion adhesives, the adhesive agents are applied after being dissolved in organic solvents or dispersed in water in order to achieve good wetting. Before the actual adhesion, the solvent or dispersion agent must be removed, for example by evaporation or by absorption into the substrate. In the case of solvents, compatibility with the substrate is important, because otherwise the properties of the joined part can be changed disadvantageously, for example, by stress corrosion cracking.

Fusion adhesives are applied as a plasticised compound and adhesion occurs directly after falling below the fusion and flow temperature.

Contact adhesives generally contain solvents, which must evaporate before the parts are joined. Adhesion can only take place when the adhesive agent is dry to the touch. After placing the parts together, correction is no longer possible. There are also contact adhesives which contain no solvent. These contact adhesives are used for sticking plasters, self-adhesive films, adhesive labels etc. As a result of the low forces of cohesion, it is possible to separate the bond several times.

b) Chemically Hardening Adhesive Agents:

In the case of chemically hardening adhesive agents, adhesion is based on the formation of macromolecules as a result of a chemical reaction. Depending on the adhesive agent, the reaction is based on polymerisation, polyaddition or polycondensation, and generally, cross-linked macromolecules are formed. This reaction is initiated by so-called reaction-agents (hardeners, accelerators), by heat and also by atmospheric humidity. Reaction agents are used in the context of two-component or multiple-component systems. Accurate mixing of these systems is a prerequisite for complete hardening.

Especially with polyolefin-based materials (PP, PE) and also many metallic materials, it is necessary to improve adhesion with so-called adhesion mediators. Adhesion mediators are used as a supplement to surface treatments and, in the form of mechanical and/or chemical processes, act either to allow or to intensify the formation of physical and chemical inter-molecular forces. Adhesion mediators are often referred to as "chemical bridges". They are either applied to the surface of the joined parts or added to the adhesive agent. They lead to an improvement in the strength of adhesive joints. The adhesion mediator is intended to supplement the effect of the conventional chemical surface treatments or, possibly in combination with mechanical processes, to replace it.

The subject matter of the present invention is the re-coating process with particular reference to the exploitation of the re-use-service. Such exploitation requires an automated process to release the shuttering film and subsequently to re-coat it. To this end, the shuttering element according to the invention is fed, for example, into a continuously operating re-coating plant. A distinction must be made between two different coating techniques, namely, the re-coating of complete modular-frame shuttering elements without preceding separation of the shuttering skin from the frame system; and the re-coating of individual shuttering skins.

Re-coating the entire modular-frame shuttering element leads to a substantial reduction in cleaning and repair costs, because removal and replacement of the shuttering skin is also unnecessary. After cleaning, the modular-frame shuttering elements are pre-finished with reference to their width and height and then fed into the re-coating plant. The cleaning process can also be integrated into the re-coating plant. In the subsequent releasing process, the shuttering film is separated from the carrier system. If the carrier system remains attached to the frame throughout the releasing and re-coating process, fastening elements such as rivets or screws between the carrier system and frame are designed in such a manner that they do not have a negative influence on the re-coating process.

The adhesive and/or adhesion mediator between the shuttering film and reinforcement or carrier system is thermally degraded by the introduction of energy or converted to a molten condition, so that the shuttering film can be removed from the reinforcement or carrier system by means of a separation device. Energy can also be introduced into the adhesive and/or adhesion mediator layer via the different forms of thermal transmission, that is, by convection, thermal conduction, thermal radiation, internal friction and/or external friction, especially with warm-gas heating elements, infrared radiators, infrared laser, in a high frequency field or using microwaves. The surface of the carrier system or the reinforcement is cleaned and a new adhesive layer and/or adhesion mediator layer is applied to the surface of the carrier system or the reinforcement by means of rollers or nozzles. Following this, a new shuttering film can be applied to the carrier system and/or the shuttering panel by means of the recoating device.

The re-coating process for individual shuttering skins does not differ from the functional method of the previously described process and the associated plant technology, apart from the fact that the shuttering skins are separated from the frame before the start of the process and introduced into the plant separately.

EXAMPLE

The following example shows the manufacture and/or restoration or replacement of shuttering skins according to the invention making use of a re-coating device.

With the assistance of a conveyor belt, carrier systems placed one after another in a row are wetted with reactive isocyanate-containing polyurethane as the adhesive. This is implemented by means of a slot-nozzle or an application roller. Following this, the carrier systems coated with adhesive are passed through a warm-gas shower to provide a suitable preparation of the adhesive zone. In this context, it is important to ensure that the materials of the carrier system and shuttering film are not thermally damaged. The temperatures occurring must not exceed the melting temperature of the synthetic material used: in the present example, foamed polypropylene: 165° C., reinforced in the edge fibres with a uni-directionally aligned glass-fibre matting. Moreover, melting and/or softening would mean releasing the reinforcement fibres from the matrix.

After warming, the separately fed shuttering film made from polypropylene is laminated onto the carrier system with a deflection roller under a defined, contact pressure. Further compression rollers increase the bonding between the shuttering film and the carrier system. Following this, the adhesive zone is allowed sufficient time for relaxation. In the next operational stage, the shuttering skin, which is fed endlessly, is finished according to the carrier system used, and the restored shuttering skin is removed from the device.

The releasing process is implemented in the reverse sequence. To this end, carrier systems, placed one after another in a row on a conveyor belt, are introduced into the releasing unit. With the assistance of a warm-gas shower, the shuttering films are warmed from the surface, in order to provide suitable preparation of the adhesive zone for the application of a belt. The belt is an important resource which allows the shuttering film to be released from the carrier system. In this stage, the belt is fed from a storage roll past a warm-gas shower and towards the shuttering film after which it is joined to the shuttering film. At this point, compression rollers ensure the necessary bonding between the belt and the shuttering film.

After the application of the belt, the system comprising shuttering film and carrier is passed through an infrared radiation field, in consequence of which the adhesive layer between the shuttering film and carrier system is heated to 120° C. and thereby deactivated. In all of these thermal processes, it is important that the materials of the carrier system and the shuttering film are not damaged.

With the assistance of the belt, the shuttering film is now released from the carrier system and directed via a deflection roller. The delaminated carrier system can now be removed from the device and taken for re-coating.

Exemplary embodiments of the invention are shown schematically in the diagrams. The diagrams are as follows.

Figure 1:
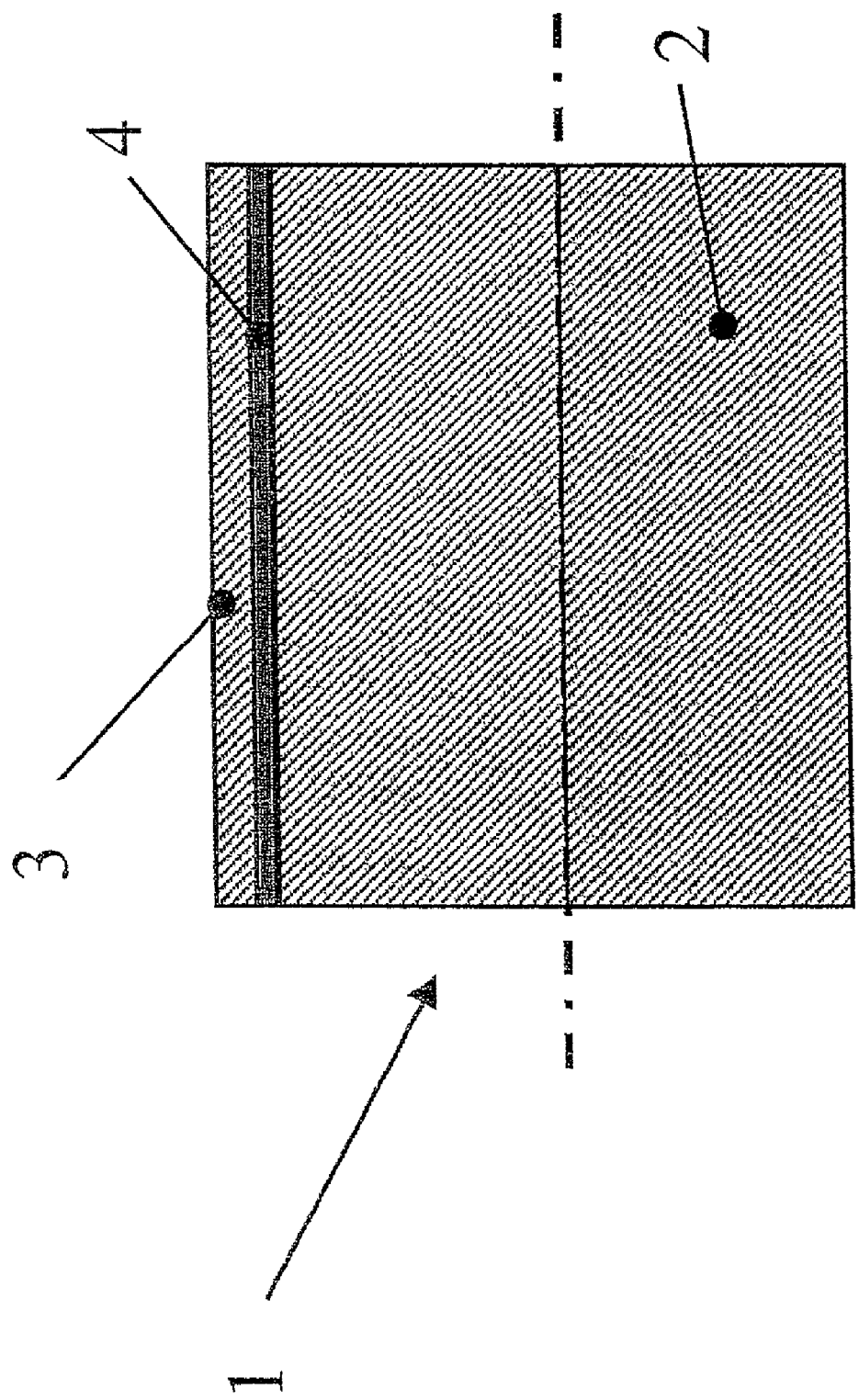
FIG. 1 shows a partial section through a 2-layer shuttering element.

The shuttering element 1 shown in partial section in FIG. 1 consists of a shuttering panel 2 acting as the carrier system, which is coated on one side 2a with a shuttering film 3. The shuttering film 3 is attached to the shuttering panel 2 and/or the carrier layer by means of an adhesion mediator such as an adhesive 4.

The shuttering element 1 shown in FIG. 1 is structured asymmetrically, because the shuttering element involved is only to be used on one side, and is not to be released from a frame system, not shown in the present diagram, so that only the side facing the concrete needs to be coated with a shuttering film 3.

Figure 2:
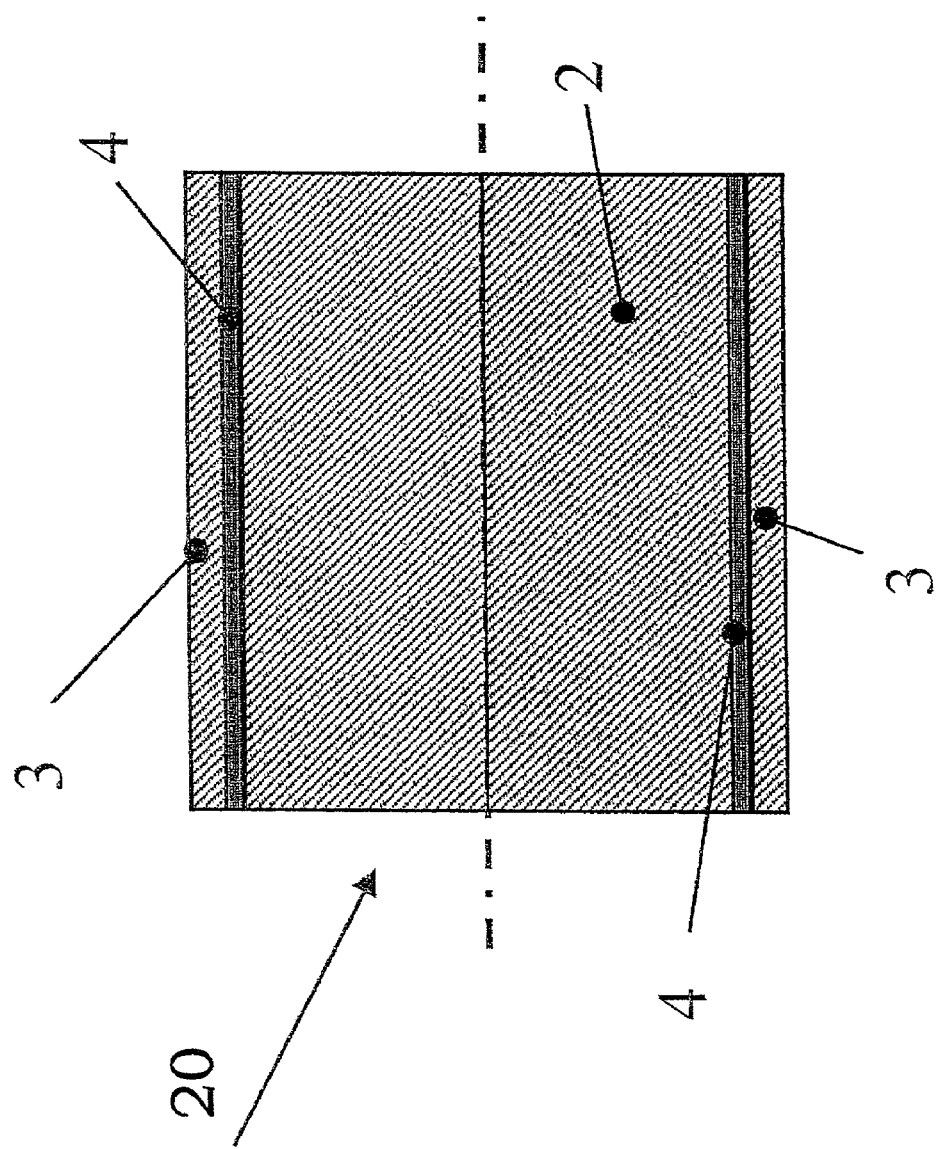
FIG. 2 shows a partial section through a 3-layer shuttering element.

The shuttering element 20 shown in FIG. 2 is provided on both sides 2a, 2b with shuttering films 3, which are attached, in each case in a releasable manner with an adhesion mediator such as an adhesive 4, to the two surfaces of the sides 2a, 2b of the shuttering panel 2. This shuttering element can be used on both sides, that is to say, it fulfils a double function.

Figure 3:
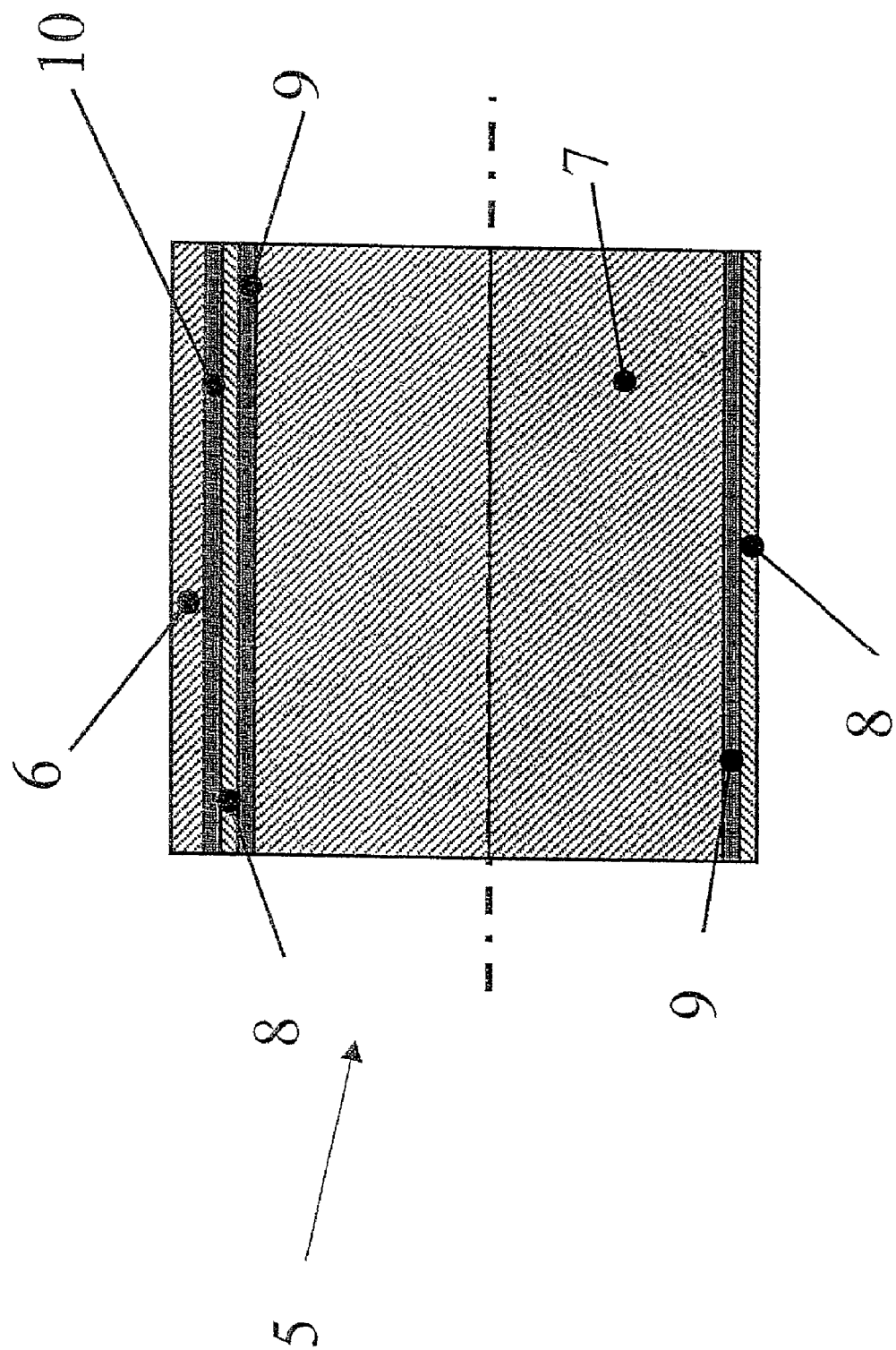
FIG. 3 shows a partial section through a 4-layer shuttering element.

The shuttering element 5 shown in FIG. 3 is provided on one side 7a with a shuttering film 6, which is attached in a releasable manner with an adhesive layer 10 to a reinforcement or reinforcing layer 8. This reinforcement 8 is permanently attached by an adhesive layer or a reinforcing layer adhesive 9 to the shuttering panel 7 which forms the carrier system. The opposite side 7b of the shuttering panel is provided with an additional glued reinforcement 8.

Figure 4:
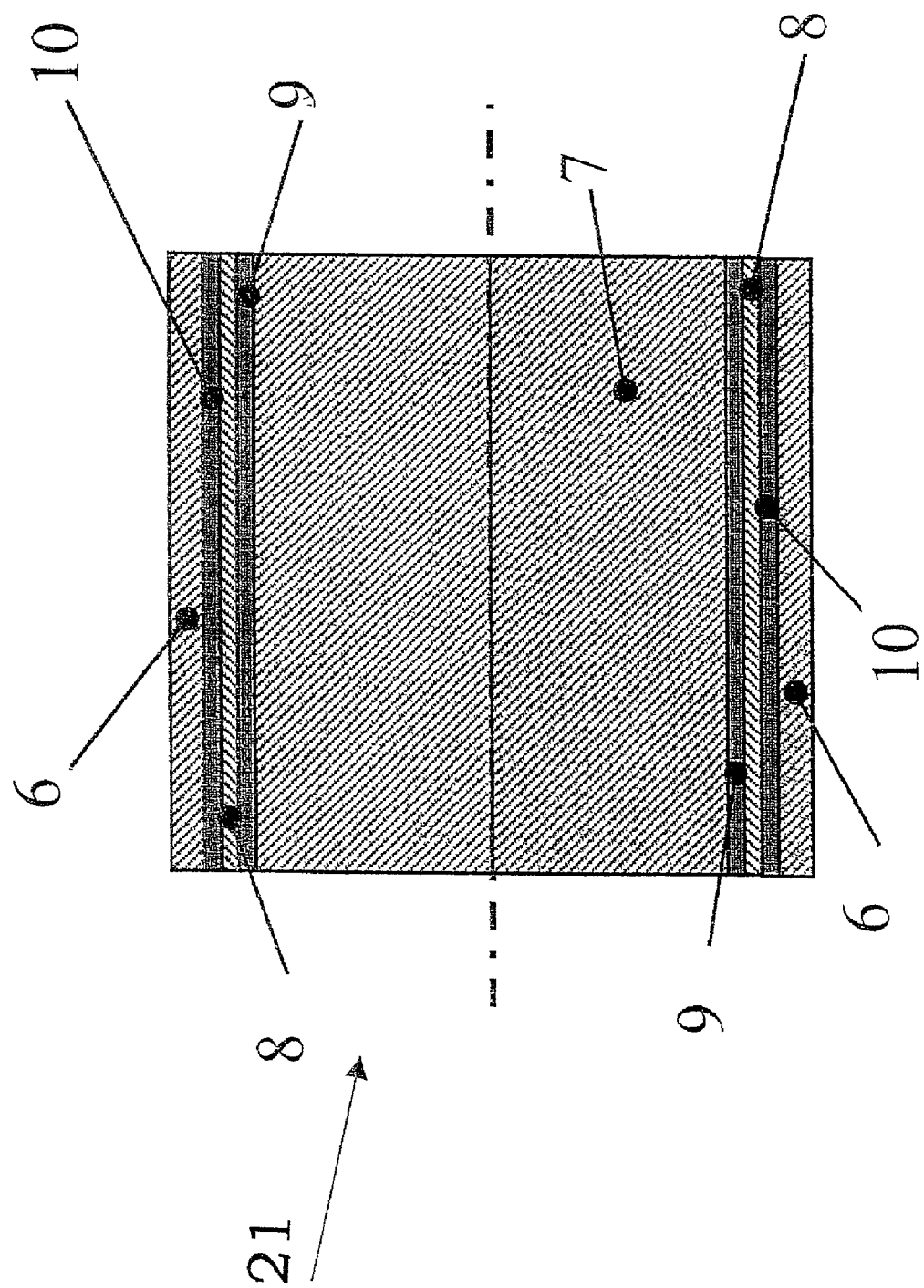
FIG. 4 shows a partial section through of 5-layer shuttering element.

Like the shuttering element from FIG. 2, the shuttering element 21 shown in FIG. 4 is provided with two external shuttering films 6, however, a reinforcement 8, which may be a fibre mat, a fabric mat and/or a thin metal plate, is provided between these two shuttering films 6 and the actual shuttering panel 7. These reinforcements 8 are attached in each case by an adhesive layer 9 to a shuttering panel 7 which forms the carrier system, while the shuttering films 6 are attached to each reinforcement 8 by a further adhesive layer 10.

With the embodiments of the present invention according to FIGS. 3 and 4, it is important that the adhesive layer 9 and the adhesive layer 10 each consist of adhesives or adhesion mediators, which are deactivated at different temperatures. While the adhesive layer 10 must be deactivated under the influence of heat in order to replace the shuttering films 6, the adhesive layers 9 must not be deactivated at the temperatures required for the deactivation of the adhesive layers 10.

Accordingly, a temperature gradient, for example, of 50° C. must be provided between the deactivation temperatures of the adhesive layers 9 and 10.

Figure 5:
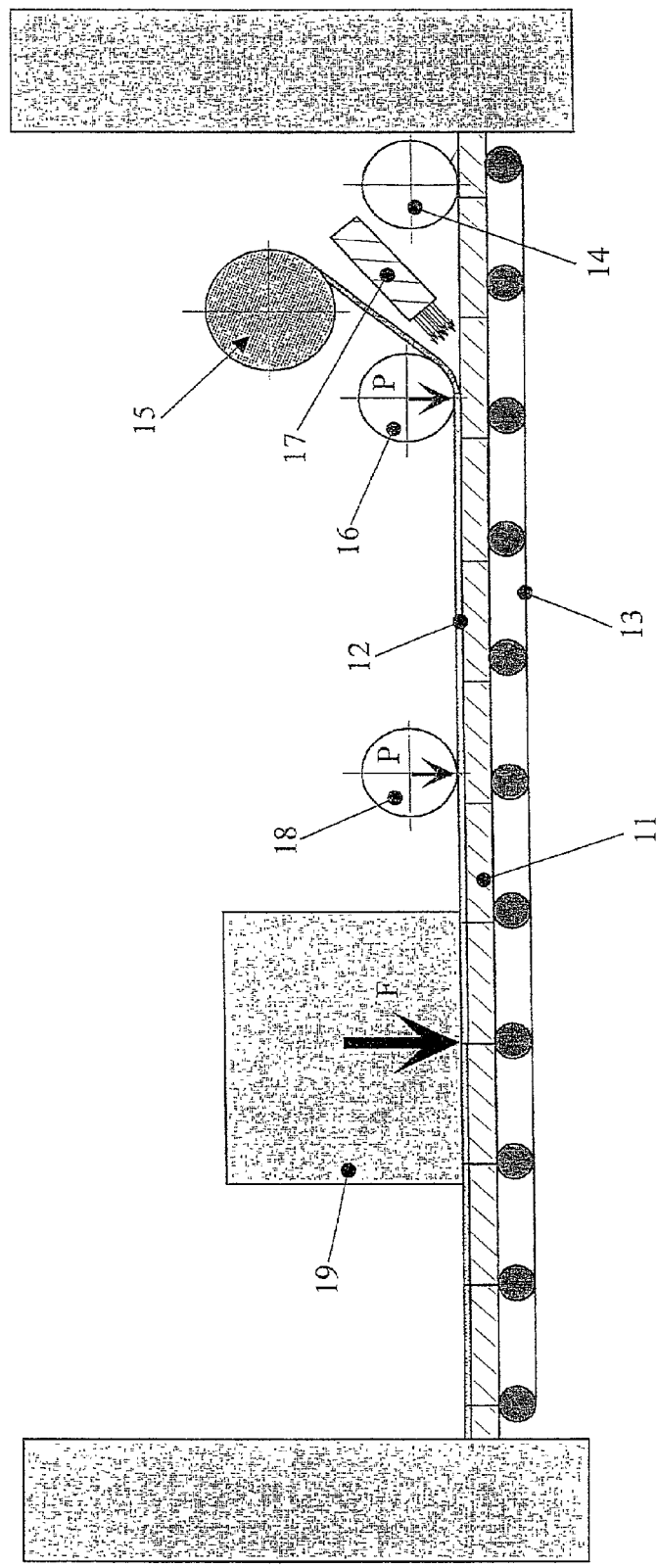
FIG. 5 shows the coating process for the carrier system with the shuttering skin and FIG. 6 shows the de-lamination process of the carrier system with the shuttering skin.

FIG. 5 shows a plant in which the shuttering panels 11 are continuously coated on one side with a shuttering film 12.

On a endless conveyor belt 13, shuttering panels 11 are conveyed one after another past a roller 14, which applies adhesive to the upper side of the shuttering panel 11. Alternatively, a slot nozzle can be used for the application of the adhesive.

The shuttering film 12 is guided from a roll 15 onto the upper side of the shuttering panels 11 and compressed with a roller 16. A warm-gas nozzle 17 ensures that the adhesive provides an adequate temperature in order to achieve the initial adhesion mediation, which can subsequently be reversed by the reintroduction of heat in order to release the shuttering film after this has become worn.

A further roller 18 again presses the shuttering film 17 onto the shuttering panels 11 to provide further strengthening of the bond. After this, a finishing device 19 is provided, which ensures that the shuttering film 12 adheres permanently and immovably to the individual shuttering panels 11. These shuttering panels 11 are then separated from one another in a manner which is not shown so that they can be used individually.

Figure 6:
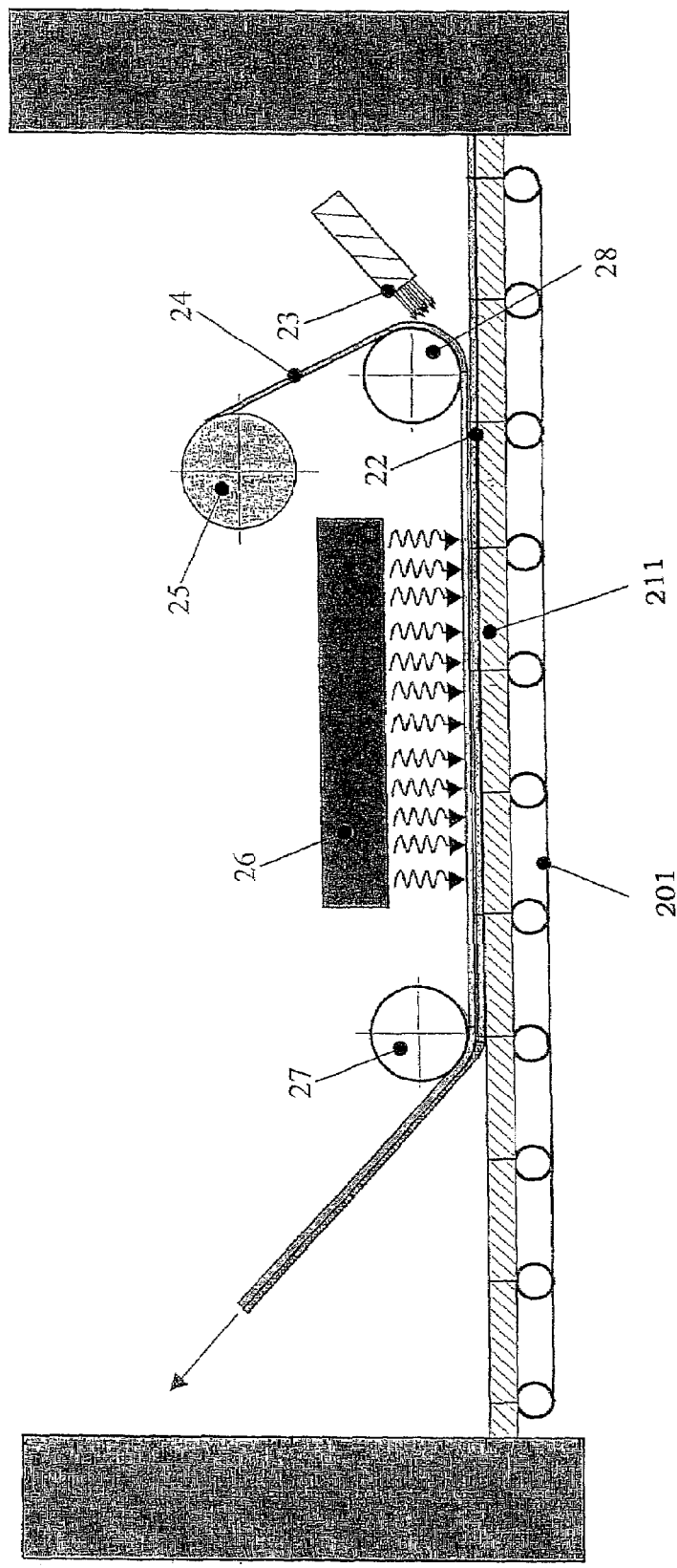

FIG. 6 shows a plant with which the shuttering films can be delaminated from the shuttering panels and accordingly removed.

Shuttering panels 211 are placed on an endless conveyor belt 201 and introduced one after another under a warm-gas shower 23, which warms the surface of shuttering film 22. In this manner, the surface of shuttering film is prepared for joining to a belt 24. During warming, it is important to ensure that the shuttering films are not subjected to such strong heating that they lose the necessary mechanical rigidity or even melt.

The belt 24 is dispensed from the storage roller 25 and with the assistance of the deflection roller 28 fed to the shuttering films where it is joined to the shuttering films subject to the process parameters of pressure, temperature and time.

In the next stage, the system of shuttering film and shuttering panel passes through an infrared radiation field, which is produced by infrared radiators 26. As a result, the adhesive between the shuttering film and the shuttering panel is heated and accordingly deactivated at a temperature, for example, of 120° C. The shuttering film 22 can now be released from the shuttering panel 211.

The mechanical separation of the shuttering films from the shuttering panels is implemented with the assistance of the belt. The belt 24 is deflected from the direction of the motion of the conveyor belt 201 by a deflection roller 27. Since the belt 24 is firmly connected to the shuttering films 22, the shuttering films follow the deflection movement of the belt 24 and are peeled from the shuttering panels 21. After this, the shuttering panels are fed in a manner not illustrated for re-coating.

The shuttering panels are re-coated in the manner described above.

The invention has been described above in connection with a shuttering panel, however, the invention may equally well be used with other panels which are used in the construction industry, for example, flooring panels for scaffolding systems.

Surprisingly, it was found with another embodiment of the invention, that a polypropylene film can be attached even without preliminary treatment with the adhesive according to the invention. It is well known, that polypropylene cannot be glued without appropriate preliminary treatment. Accordingly a person skilled in the art will be of the opinion that the polypropylene film must first be subjected to preliminary treatment with a preliminary primer or corona treatment. Surprisingly, however, it was shown that the moisture-reactive fusion adhesive based on polyolefin can be applied directly without preliminary treatment. Moreover, it is surprising that the adhesive is not released again from the polypropylene film when this is glued to the carrier. A person skilled in the art would have assumed that during this renewed heating process, the fusion adhesive previously applied to the film would not be capable of reactivation in order then to be connected to the carrier and, therefore, that the process and/or the device would not function correctly.

In order to attach the pre-finished film 6, (also referred to as the film facing or shuttering film in order to distinguish it from the film 8 which is permanently and immovably connected to the carrier) to the panel, the film is fed onto the panel at an oblique angle. Within this oblique angle, an infrared heat radiator is located. This heating element warms the underside of the film on the side which provides the adhesive. On the other side, the surface of the panel is pre-heated. The fusion adhesive is selected in such a manner that the reaction temperature and/or softening temperature is below the temperature at which polypropylene would soften. Polypropylene melts at 165° C. In one advantageous embodiment, the fusion adhesive typically melts at approximately 130° C. The heat output is selected in such a manner that, on the one hand, the fusion adhesive softens, and, on the other hand, the surface of the polypropylene does not melt.

Together with the panel, the film is fed into a belt press or a roller press, where the film is welded to the panel.

To allow the film to be released at a later stage, the surface is also initially heated. A start of the film is released by applying a suction element, and with the assistance of the suction element, the film or the beginning of the film is lifted. After this, the film can be completely removed using mechanical gripping elements, for example, pneumatically or hydraulically activated elements. The gripping element can grip, for example, by means of suction. A suction gripping element is used, in particular, if the film has been fitted into a frame in such a manner that it is not accessible from the side.

The re-coating process can be implemented either continuously, in batches or individually. Furthermore, it is not necessary for the shuttering film or skin to be released without damage from the carrier system or shuttering panel. It is not absolutely essential to clean the surface of carrier system, in particular, if the residual adhesive becomes so soft during re-coating that it does not deform the adjacent film or if the residue is slight. The carrier system may also be connected to the frame with rivets, screws or another appropriate manner, in particular, by gluing or by form-fit connection. Furthermore, when re-coating the carrier, it is advantageous if a film coated with a suitable adhesive, that is, a pre-finished film is used. In this case, the coating device does not require a means for applying the adhesive layer to the carrier, and the plant can therefore be structured in a simpler manner. The adhesive can be metered and applied to the film in a cost-favourable and centralised manner.

Furthermore, it is important for the adhesive layer 10 (FIGS. 3 and 4) to consist, in each case, of adhesive agents/adhesion mediators, which are deactivated at a temperature approximately 120° C.–130° C. below the melting or degradation range of the shuttering film or the carrier system.

Figure 7A:
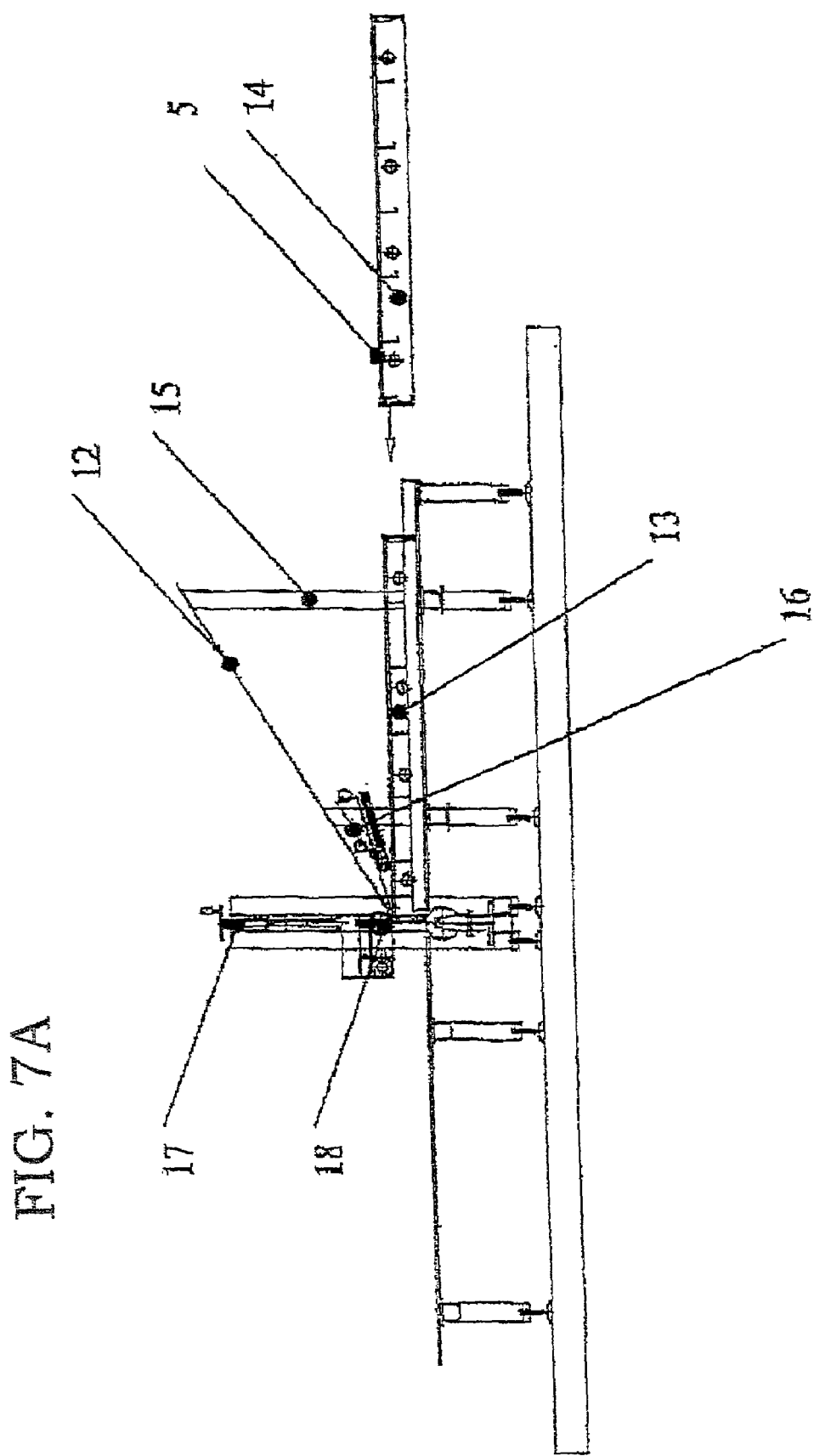
Figure 7B:
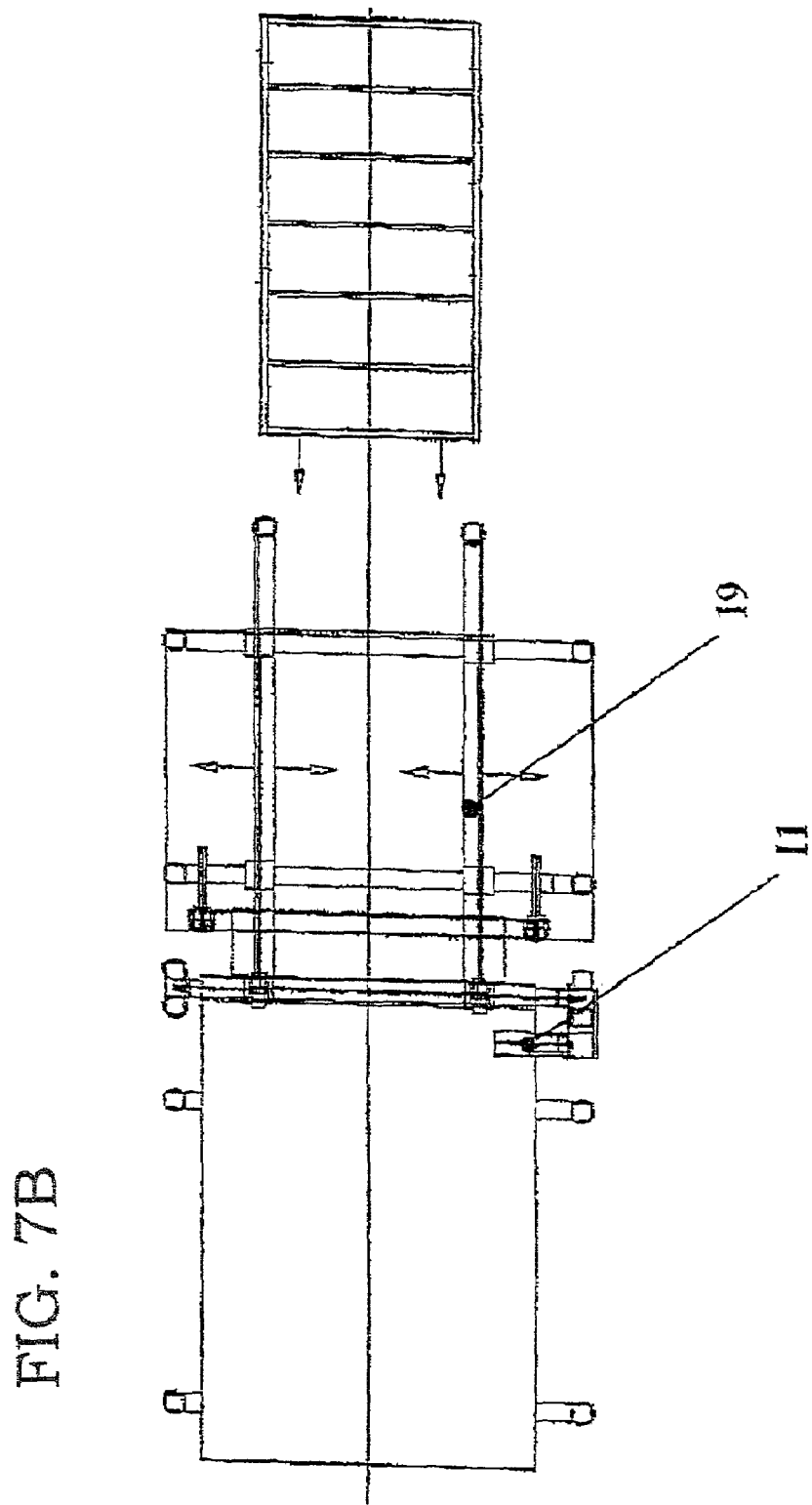

FIG. 7A shows a front view of a new-coating and/or re-coating plant with which modular-frame shuttering with a carrier system on one side is coated with a shuttering film 12, and FIG. 7B shows a plan view of a new-coating and/or re-coating plant with which modular-frame shuttering with a carrier system on one side is coated with a shuttering film 12.

With the plant shown, the shuttering panels 11 are coated continuously on one side with a shuttering film 12. The pre-finished shuttering films 12 which have been impregnated with adhesive are stored on a feed device 15. The individual shuttering films 12 are supplied according to the principle of an inclined plane. In the lower region, a support is provided to protect the shuttering films 12 from sagging as a result of the heating process.

The modular frame shuttering provided with the carrier system 5 is placed on a roller track 13. Accurate adaptation of the plant to the relevant dimensions of the modular-frame shuttering is achieved by means of the height adjustment 17 and the variable-width end-stop rail 19.

Both the surface of the carrier system and also the adhesive on the shuttering film are warmed with the assistance of a warm-gas shower by manual feeding of the modular-frame shuttering 14 into the heating zone. A warm-gas shower ensures that the adhesive initially provides an adequate temperature in order to achieve adhesion which can be reversed through the re-application of heat in order to release the shuttering film after this has become worn. The warm-gas shower is designed in the form of a slot nozzle 16.

When the adhesive is in a molten condition, the shuttering film and the modular frame shuttering are conveyed to a rubber-coated compression roller 18 driven by a separate drive 11 which provides a feeding motion. The shuttering panel and modular frame with carrier are fed through the compression rollers and are accordingly attached to one another. After this, the coated systems can be removed from the plant.

FURTHER EXAMPLE

The following example shows the manufacture and/or restoration or re-facing of shuttering skins according to the invention using a re-coating device according to FIGS. 7a and 7b.

The following preliminary work must be completed before the actual operational process of re-coating is implemented:

Firstly, the pre-finished shuttering film, that is, the area of the shuttering film already adapted to the area of the panel-shaped carrier, is wetted with adhesive. To this end, preferably a moisture-reactive adhesive, that is, a fusion adhesive based on polyolefin which cross-links on contact with moisture, even atmospheric moisture, is applied to the PP film. With this adhesive system, it is possible to glue PP-substrates without preliminary treatment (plasma, corona etc.). Moisture-reactive fusion adhesives provide two hardening processes.

One suitable and preferred moisture-reactive fusion adhesive based on polyolefin within the sense of the invention is the reactive APAO-Hotmelt "Jowatherm-Reaktant®" manufactured by Jowat, Lobers und Frank GmbH & Co. KG, Detmold. This is an isocyanate-free, moisture-cross-linking fusion adhesive with a long open period with good adhesion to synthetic materials, glass and ceramics. Cross-linking takes place within 7–14 days depending upon the ambient moisture. The processing temperature is 140–170° C., the open period 120 seconds, the hardening time approximately 25 seconds, the viscosity (Brookfield Thermosel) at 140° C. is approximately 17,500 mPas; the density is approximately 0.89 g/cm$^3$ and the softening range (Kofler) approximately 70° C.

Cooling initially leads to a physical hardening process by crystallisation; handling strength is achieved rapidly after gluing. In the second stage, a reaction takes place between the adhesive polymers and moisture (atmospheric and/or substrate moisture) and/or reactive groups on the surface of the substrate. This leads to a cross-linking (chemical hardening), through which the adhesive properties are improved with reference to adhesion and cohesion. The adhesive agent is applied with conventional adhesive application systems (rollers, nozzle). The processing temperature is within the range from 120–180° C., preferably 130° C.

Secondly, the carrier system is fitted in the modular-frame shuttering. The two elements are joined by means of rivets or adhesive, to ensure a flat surface. The carrier system consists of a sandwich structure, which is provided in the core with a closed-cell PP-foam, preferably with a density from 200 to 700 kg/m$^3$, and glass-fibre reinforcement laminated on both sides and woven bi-directionally. The carrier system, a so-called composite, is produced in a thermal double belt press and finished according to the necessary dimensions for modular-frame shuttering.

The actual coating and/or re-coating process of the carrier system with the shuttering film proceeds as follows: with the assistance of a handling system, modular-frame shuttering with the carrier system joined is positioned on a roller track of the recoating plant. Furthermore, the shuttering film impregnated with adhesive is placed into the feeder device. After this, the joint zone, that is, the adhesive and the cover layer of the carrier panel, is heated. This is implemented with an infrared heat radiator for contact-free heating of materials in order to prepare the adhesion zone appropriately. In this context, it is important to ensure that the material of the carriers system and the shuttering film are not subjected to thermal damage. The temperatures occurring must not exceed the melting temperature of the synthetic material used: in the present example, polypropylene: 165° C. Moreover, the melting or softening of the edge region of the carrier panel would lead to the release of the reinforcement fibres from the matrix. After initial warming, the separately supplied shuttering film made from the material polypropylene is laminated onto the carrier system with a rubber-coated compression roller at a defined pressure. The relative movement of the compression roller at the same time realizes the feed movement for the modular-frame shuttering during the lamination process. Following this, the adhesion zone is allowed sufficient time for relaxation. The newly coated or re-coated modular-frame shuttering is removed from the device. The lamination process proceeds in a cyclical manner.

The releasing process, that is, the de-lamination of the shuttering film from the carrier system, is implemented in the reverse sequence. To this end, modular-frame shuttering provided with a carrier system is conveyed to a roller track of the releasing unit with the assistance of a handling system. The adhesive zone between the shuttering film and carrier system is heated by means of an infrared heating radiator. Targeted heating of the adhesive deactivates the adhesive above a temperature which must be below the melting temperature of the PP, preferably 120–140° C., because of the minimisation of the cohesive force of the adhesive. In the edge region which has been loosened in this manner, a device can be applied manually which allows the shuttering film to be gripped in order to remove it from the carrier system. Simultaneously with this gripping procedure, the joint zone between the shuttering film and carrier panel is pre-heated over the remaining area. When it has been established that the gripping system can release the film from the carrier system against the still active forces of adhesion, the modular-frame shuttering is subjected to a forward feeding movement contrary to the direction of withdrawing the film. In this context, it is important to ensure that the warm-gas shower constantly heats and therefore deactivates the adhesive in the joint zone. After the shuttering film has been released from the carrier system, the modular-frame shuttering is removed from the releasing unit and fed into a re-coating process. The procedure for the de-lamination process is carried out in a cyclical manner.

A continuous de-lamination procedure will be described below. To this end, the carrier systems are fed on a conveyor belt into the releasing unit. With the assistance of a warm-gas shower, the shuttering films are heated from the surface in order to prepare the adhesive zone appropriately for the application of a belt. The belt is an important resource, which allows the shuttering film to be released from the carrier system. This takes place when the belt is dispensed from a storage roll past the warm-gas shower towards the shuttering film and joined to the shuttering film. In this context, compression rollers ensure the necessary bonding between the belt and the shuttering film.

After the application of the belt, the system consisting of the shuttering film and carrier passes through an infrared radiation field which results in the adhesive layer between the shuttering film and carrier system being heated to 120° C.–140° C. and thereby deactivated. With all of the thermal processes, it is important to ensure that the temperature is selected in such a manner that the materials of the carrier system and the shuttering film are not damaged, but that the adhesive layer is deactivated. The temperatures indicated are therefore exemplary for the materials selected.

With the assistance of the belt, the shuttering film is now released from the carrier system and removed via a deflection roller. The de-laminated carrier system can now be removed from the device and taken for re-coating.

The invention also relates to a synthetic-material panel. The use of a reinforced synthetic-material panel is suggested as a carrier system. By comparison with plywood, synthetic material provides the disadvantage that it is not sufficiently rigid. As a result, reinforcement must always be provided. According to the invention, a glass-fibre reinforcement is applied on one side, preferably on both sides.

According to the prior art, non-aligned, short, random fibres are used. However, according to the invention, the glass-fibre reinforcement consists of long threads, which extend along the entire length of the panel. These are worked together with transverse threads to form a mat.

By preference, fibres made from polypropylene (PP) are used in addition to the glass-fibres. The different fibres are mixed with one another. This ensures a firm embedding of the fibres in the subsequent product, if the fibres are welded into the subsequent final product, because the PP fibres melt and therefore contribute to the welding effect.

The carrier system is manufactured as follows:

A core made from synthetic foam material, in particular from polypropylene, is introduced together with the glass-fibre webs and additional polypropylene films into a double-belt press. The glass-fibre mat is then located between the core and the polypropylene film, which is always transparent and can be approximately 1 mm thick. The polypropylene film is welded to the core in the double-belt press. The glass-fibre reinforcement is embedded at this stage. This provides a carrier panel which is substantially more rigid than is possible with synthetic material panels made according to the prior art.

It is true that a carrier panel made from plywood generally provides greater rigidity than the synthetic-material panel according to the invention. However, this assumes a residual moisture of 10–15% by weight. During operation, the residual moisture of a plywood panel increases as a result of rain and other environmental conditions. In particular, the increase in moisture results from contact with the wet concrete. In this manner, the residual moisture in the wood increases by up to 30% by weight. Accordingly, the elastic modulus declines by up to 50%. Under these conditions, the rigidity of the plywood panel is lower than the rigidity of the panel according to the invention. Since the panel according to the invention is not susceptible to moisture, and particularly since the rigidity properties are not altered by the effect of moisture, the synthetic-material panel is superior under operational conditions to the plywood panel because of its greater rigidity.

The panel according to the invention is advantageously manufactured using the co-extrusion process. In this context, synthetic-material granulate is supplied to a screw feeder. Heated synthetic material is conveyed via the screw feeder to a nozzle. The glass-fibre mats are also supplied to the nozzle. The synthetic-material layer in which the glass-fibre mats have already been integrated, is then extruded from the nozzle. The product is cooled in a cooling tract. In this manner, the finished product can be provided without the need for additional compression. This leads to cost advantages in manufacturing.

With the co-extrusion process, panels can be produced not only continuously but also individually. Synthetic material is introduced in appropriately metered portions. The finished panels are then produced directly.

In a further manufacturing process, the glass-fibres are already welded into a PP layer of which the layer thickness is 0.5–2 mm, for example, 1 mm. A foamed panel made from PP is obtained. For reasons of cost and weight, the panel provides a foam-type core. The panel consisting of PP is glued on both sides to the PP-layers. Long fibres which extend over the entire length and/or width of a layer are used in each PP-layer. The transverse and longitudinal fibres are woven together.

In a further manufacturing process, PP is injected between two PP-layers in a hot, liquid condition. A separate adhesive is not required. The PP-layers again provide long fibres, which extend over the entire length and/or width.

Depending on type of glass-fibre fabric, the adhesive layer 9 in FIGS. 3 and 4 can be dispensed with. If a Twintex fibre is used in which PP fibres and/or threads are woven together with glass-fibres, the glass-fibres are consolidated in the shuttering panel 7 using a thermal process with the assistance of a double-belt press.

A shuttering element consists of a metal frame with transverse stays. The panel is placed into this frame. During operation, the panel bends between the transverse bearers. If the synthetic-material panel provides threads which extend from one end of the panel to the other transversely to these transverse stays, the panel will consistently be less able to bend by comparison with a panel in which random fibres are used. In particular, when random fibres are heated, the problem arises that a flowing motion occurs up to the point of solidity. This effect is counteracted by positioning the threads according to the invention.

Polypropylene provides the advantage that it contains no toxic substances and can be re-used as a thermoplast.

Moreover, the panel according to the invention can particularly be used, for example, to replace plywood in vehicle manufacture. This refers especially to heavy-goods-vehicle super structures, which are regularly exposed to compression and tensile stresses. In this context, it is conventional to use a core made from plywood for reasons of rigidity. One further advantageous area of application for the present panel is therefore in the motor vehicle manufacturing industry.

Other areas of application are also, of course, possible. Container structures, event stages, shunting and running surfaces, apparatus and container construction, facade elements, shelving units, ship building, floor panels for building scaffolding are further exemplary applications for the panel according to the invention.

The invention claimed is:

1. A shuttering element including a panel-shaped carrier having opposed sides providing support surfaces for cooperating in the shaping of uncured concrete and a rigidity sufficient to enable said shuttering element to be used as a form to shape uncured concrete, said carrier being reusable and susceptible to damage at said support surfaces during use, a film covering at least one of said support surfaces on at least one side of said carrier, said film having a first outer film surface forming a contact surface with uncured concrete to be shaped, said film having a second outer film surface remote of said first outer film surface attached to the carrier in a replaceable manner by a film layer adhesive capable of deactivation by heating, said film being removable from said carrier without damage to the carrier upon deactivation of said film layer adhesive and replaceable with additional film free of damage resulting during contact with uncured concrete to be shaped, said film contacting and shaping concrete as the concrete is cured so that the concrete is contacted with said contact surface and any damage to the shuttering element support surface will not be visible or transferred to the concrete, and said carrier is maintained as a part of said shuttering element upon reuse.

2. The shuttering element according to claim 1, wherein both support surfaces on both sides of said panel-shaped carrier are covered with said film.

3. The shuttering element according to claim 1, wherein said panel-shaped carrier is provided on said at least one side with a reinforcing layer attached to said carrier by a reinforcing layer adhesive, said film second outer surface being attached to said reinforcing layer by said film layer adhesive.

4. The shuttering element according to claim 3, wherein said reinforcing layer adhesive has a reinforcing layer adhesive deactivation temperature and said film layer adhesive has a film layer adhesive deactivation temperature, and said reinforcing layer adhesive deactivation temperature is higher than said film layer adhesive deactivation temperature.

5. The shuttering element according to claim 1, wherein said film layer adhesive deactivation temperature in the range of from about 120° C. to about 140° C.

6. The shuttering element according to claim 3, wherein said film layer adhesive deactivation temperature in the range of from about 120° C. to about 140° C. and said reinforcing layer adhesive deactivation temperature in the range of from about 170° C. to about 190° C.

7. The shuttering element according to claim 1, wherein said film layer adhesive deactivation temperature and said film has a melting or degradation temperature, and said deactivation temperature is from about 120° C. to about 130° C. below the melting or degradation temperature of said film.

8. The shuttering element according to claim 7, wherein said film melting or degradation temperature is about 165° C.

9. The shuttering element according to claim 1, wherein said panel-shaped carrier has a rigidity greater than that of a similar plywood panel with a residual moisture above 10 to 15% by weight.

10. A shuttering element including a panel-shaped carrier having opposed sides providing support surfaces for cooperating in the shaping of uncured concrete and a rigidity sufficient to enable said shuttering element to be used as a form to shape uncured concrete, said carrier being reusable and susceptible to damage at said support surfaces during use, films covering each of said support surfaces of said carrier, each of said films having a first outer film surface forming a contact surface with uncured concrete to be shaped, each of said films having a second outer film surface remote of said first outer film surface attached to an associated support surface of the carrier in a replaceable manner by a film layer adhesive capable of deactivation by heating, said films being removable from said carrier without damage to the carrier upon deactivation of said film layer adhesives and replaceable with additional film free of damage resulting during contact with uncured concrete to be shaped, said film contacting and shaping concrete as the concrete is cured so that the concrete is contacted with said contact surface and any damage to the shuttering element support surface will not be visible or transferred to the concrete, and said carrier is maintained as a part of said shuttering element upon reuse.

11. The shuttering element according to claim 10, wherein said film layer adhesive has a deactivation temperature at which said films are separable from said carrier.

12. The shuttering element according to claim 11, wherein said panel-shaped carrier is provided at least on one side with a reinforcing layer attached to said carrier by a reinforcing layer adhesive, and at least one of said films is attached to said reinforcing layer by said film layer adhesive.

13. The shuttering element according to claim 12, wherein said reinforcing layer adhesive has a deactivation temperature that is a higher temperature than the deactivation temperature of said film layer adhesive.

14. The shuttering element according to claim 12, wherein said reinforcing layer has a melting temperature that is higher than said film layer adhesive deactivation temperature.

15. The shuttering element according to claim 10, wherein a supply roll of film coated with film layer adhesive is provided, and said film with said coated film layer adhesive is dispensed from said supply roll and said film layer adhesive is activated by the influence of heat before application of said film to said carrier, and said film is then pressed on to said carrier.

16. The shuttering element according to claim 15, wherein said film facing is pressed on to said carrier by compression rollers and a variable width end stop rail.

* * * * *